Figure 1:
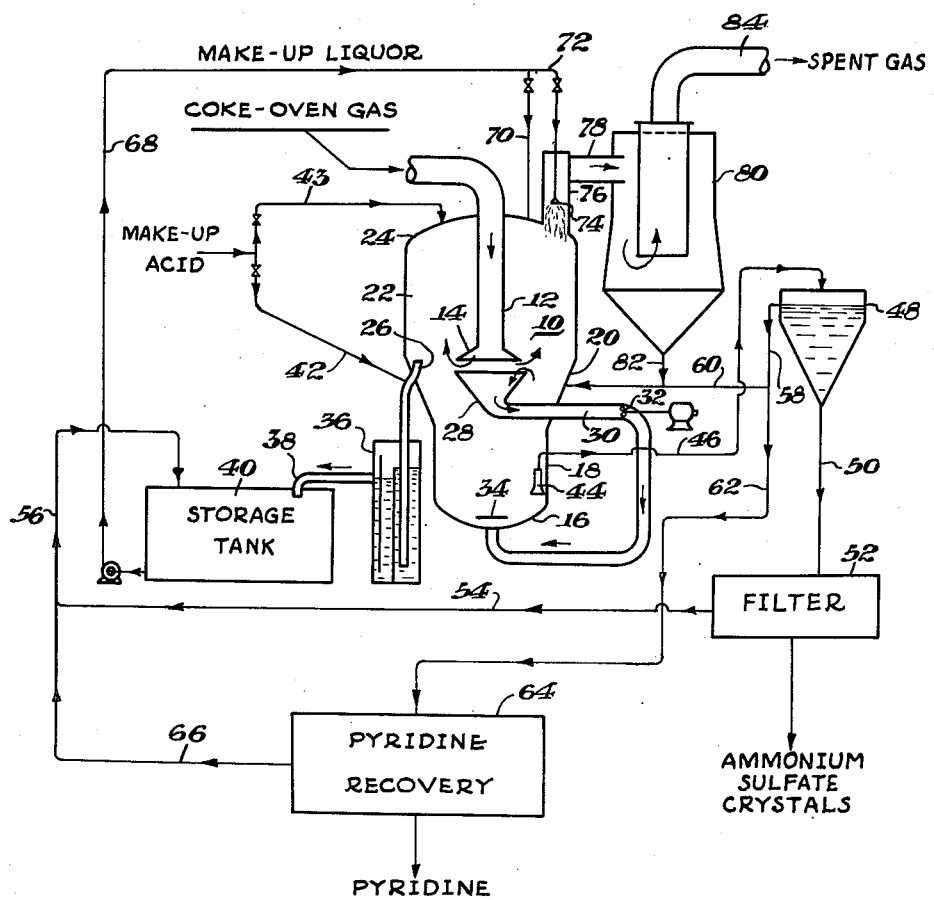

April 29, 1952      E. V. SCHULTE      2,595,104
PROCESS FOR THE RECOVERY OF AMMONIUM SULFATE
Filed Sept. 17, 1947      2 SHEETS—SHEET 1

INVENTOR.
ELWOOD V. SCHULTE
BY
ATTORNEY.

Patented Apr. 29, 1952

2,595,104

UNITED STATES PATENT OFFICE 2,595,104

PROCESS FOR THE RECOVERY OF
AMMONIUM SULFATE

Elwood V. Schulte, Pittsburgh, Pa., assignor to
Koppers Company, Inc., Pittsburgh, Pa., a corporation of Delaware Application September 17, 1947, Serial No. 774,522

5 Claims. (Cl. 23—119)

This invention relates to the recovery of ammonia and pyridine and its congeners from gases containing them, such as coke-oven gases, and is particularly directed to the operation of ammonium sulfate saturators in a manner to effect a high recovery of these products with a minimum expenditure of power.

In the operation of ammonium sulfate saturators, the ammonia containing gas has customarily been led into an aqueous body of sulfuric acid at a point considerably below the surface. This results in a large pressure differential which can be overcome only by a relatively high consumption of power. In my copending application, Serial No. 620,257, filed October 4, 1945, and in my copending application, Serial No. 774,521, filed of even date hereof, I have shown how the depth of the seal, as it is called, may be reduced and even completely eliminated whereby commensurate savings in power consumption are effected.

I have found, however, that while it is possible to effect high recoveries of ammonia under such circumstances, it is not possible to effect adequate recovery of pyridine and its congeners. By congeners of pyridine, I mean other pyridine bases such as the picolines and the lutidines commonly found associated with pyridine in ammonia containing gases such as are derived from coke-ovens. Pyridine and its congeners show relatively high vapor pressures over the saturator solution. Consequently, it requires a deeper seal to effect adequate recovery of pyridine.

I have further found that recovery of pyridine and its congeners is still further minimized by desorption in the spray. When the seal is reduced, or when the efficiency of the gas-liquid contact is otherwise reduced, there is correspondingly more ammonia in the effluent gas. While this increase is relatively small, say, in the order of a few percent of the total ammonia processed, and consequently of little significance in and of itself, it nevertheless has a material effect upon the recovery of pyridine and its congeners. Where formerly the spray from the saturator solution tended to scrub the gas free of pyridine and its congeners and remained uneffected by the effluent gas, it now results that this spray is neutralized by this excess ammonia with the result that the solubility of pyridine and its congeners is so reduced that they are no longer absorbed by the spray or even retained therein and pass on out with the spent gases.

I have now found that these difficulties may be avoided and ammonia and pyridine and its congeners effectively recovered in low differential saturator operations by treating the effluent gas from such operations by the processes of this invention. Thus, by passing an ammonia-containing gas containing also pyridine, with or without one or more pyridine congeners, in contact with saturator solution under conditions such that ammonia is substantially absorbed (75% or more) and pyridine bases are not, and treating the effluent gas by the processes of this invention, I am able to effect high recovery of ammonia and pyridine bases and at the same time to effect operation of the saturator with unusually low pressure differentials.

Ammonium sulfate in-process solutions are conveniently and most desirably used as pyridine absorbents. Saturator solutions in which the pyridine content is kept low by continuous or periodic treatment by pyridine recovery is suitable. Make-up liquor is also suitable and has the advantage of having had its affinity for pyridine increased by the fresh acid incorporated therein. Ammonium sulfate solution from pyridine recovery is also suitable and has the advantage of containing little, if any, pyridine. Make-up acid can also be used but is undesirable because of corrosion and because of its strong dehydrated effect. It also is undesirable because of its tendency to sulfonate unsaturated hydrocarbons in the effluent gas. I prefer, therefore, to use ammonium sulfate solutions containing sufficient sulfuric acid effectively to absorb pyridine from the effluent gas and I prefer that such solutions be unsaturated in order to avoid the possibility of salting out (growth of salt incrustation on parts of the apparatus) in the handling of such solutions.

During the operations the saturator solution is continuously or periodically bled off as required to maintain the pyridine content thereof at a sufficiently low value and treated to recover pyridine therefrom. The thus treated saturator solution is again returned to process. An advantage is obtained if this saturator solution thus freed of pyridine bases is utilized to provide at least part of the scrubbing liquor for the effluent gases.

This invention may be more fully understood by reference to the accompanying drawing in which there is shown in diagrammatic form a saturator such as is described and claimed in my copending application, Serial No. 620,257, filed October 4, 1945, modified in accordance with the present invention.

In accordance with the embodiment of the invention illustrated in Fig. 1 of the drawing, coke-oven gas, or other gas containing ammonia and pyridine bases, is led into saturator 10 through inlet pipe 12, extending downwardly in the center of the saturator and provided with a bell-shaped cracker pipe 14, located substantially at or below the normal liquid level of the saturator. The saturator 10 is provided with a concave bottom section 16, a cylindrical bottom section 18 extending upwardly therefrom, a conical section 20 flaring outwardly from the cylindrical bottom section 18, a cylindrical top section 22 extending upwardly from the top of the conical section 20 and a cover section 24, thus constituting a gas-tight enclosure.

Overflow means 26 is located in the saturator bowl as required to maintain the level of liquid in the saturator in the proper correlation to the cracker-pipe 14. Normally, the liquid level will be substantially at the top of the conical section 20.

Near the normal liquid level and slightly below is an inverted suction head 28, which may be dish-shaped or conical as shown, connected through pipe 30 to the bottom of the saturator bowl, the pipe 30 is provided with a suitable pump 32 for withdrawing liquid into the suction head 28 and transferring it to the bottom of the saturator bowl. The inverted suction head 28 is arranged to withdraw liquid from the saturator bowl at an elevation slightly below the surface and over a substantial area and the withdrawn liquid is injected upwardly into the saturator bowl through the deflecting plate 34, all as more fully set out in my copending application, 620,257, to provide a substantially uniform upward flow of solution in the cylindrical bottom portion 18 of a magnitude sufficient to maintain a classification of crystals therein. The solution is withdrawn at a rate sufficient to maintain the saturator solution only slightly supersaturated. The solution should not be allowed to become supersaturated in the region where new crystals form in the absence of seed crystals, that is, should not be allowed to exceed about 105% of saturation. Preferably, however, the degree of supersaturation should be kept within the region where new crystals do not form in the presence of seed crystals; that is to say, in the region below about 101.5% of saturation. The former requires that at least 16.5 gallons of saturator solution be withdrawn for each pound of ammonia absorbed, and the latter requires that at least 55 gallons of solution be withdrawn for each pound of ammonia absorbed. Ordinarily, a substantially greater rate of flow is desirable.

The size of the saturator bowl section 18 is so correlated with the rate of flow as to maintain an upward movement of solution therein of between 25 and 150 gallons per square foot of cross sectional area per minute; 50 gallons per square foot per minute being optimum. Putting it another way, the cross sectional area of the cylindrical section 18 should contain between 0.4 and 2.4 square feet, preferably 1.2 square feet, for each gallon of saturator solution introduced therein per second.

During the operation of the saturator it is desired to maintain about 15 percent by weight of crystals in suspension in the saturator bowl although satisfactory results have been obtained within the limits of about 3.5 and about 60%.

The saturator solution is maintained at an acid concentration between about 1 and about 8% sulfuric acid and the temperature is maintained between about 35 and 70° C. Other details of operation and constructions, as well as modified forms, may be ascertained by referring to my copending application, Serial No. 620,257.

Liquor overflows the saturator by means of the overflow 26 into the tar skimmer 36 and from there through line 38 into storage tank 40. Part of the make-up acid is added through line 42 to the tar skimmer. Water may be added also, if necessary, to dissolve any crystals of ammonium sulfate carried over and to insure that the liquor in the storage tank 40 is always below saturation. The balance of the make-up acid is added through line 43 directly to the saturator solution in order to provide more immediate control of the acidity thereof.

A crystal slurry is also withdrawn from the saturator by means of suction head 44 and transferred through line 46 to settling cone 48. The crystals which settle out pass through line 50 to filter 52 and the filtrate passes through lines 54 and 56 to the storage tank. Clear liquor from the settling cone overflows into line 58 and is returned to the saturator through line 60. Part of the overflow passes through line 62 to the pyridine recovery 64, and the pyridine free liquor passes through lines 66 and 56 to the storage tank.

The amount of liquor taken off by line 62 is regulated to keep the pyridine content in the saturator liquor less than 4 or 5%. As long as the pyridine content is maintained below 5%, and preferably below 3%, satisfactory recovery of pyridine is obtained. Any suitable method for the recovery of pyridine may be utilized. Suitable methods include those disclosed in U. S. Patents 2,270,585 and 2,311,134. A higher pyridine content is permissible in the processes of the invention, however, because of the treatment of the effluent saturator gases by the processes of this invention. In both of these processes for the recovery of pyridine from the saturator liquor the ammonium sulfate liquor recovered is substantially neutral. It may be returned to the process as desired. Suitably, however, it is returned to the storage tank 40.

The various liquors which are collected in the storage tank 40 collectively constitute the make-up liquor for the saturator. Since the filtrate from filter 52 and the ammonium sulfate liquor from pyridine recovery 64 are not supersaturated and since any supersaturation in the overflow liquor is destroyed by the addition of make-up acid and water, if necessary, the make-up liquor is easily maintained below saturation. In this condition it is passed through line 68 and 72 to the spray-head 74 where it is sprayed downwardly into the uptake 76. In this manner the effluent gas leaving the saturator through uptake 76 comes in intimate contact with a spray of make-up liquor which acts to scrub ammonia and pyridine therefrom. The effluent gas then passes through line 78 over into the spray catcher 80. The condensed spray is returned to the saturator through lines 82 and 60 and the mist-free gas or spent gas passes out through line 84. Part of the make-up liquor may be bled off through line 70 and introduced directly into the saturator if desired. Because of its unsaturation, it may be used in this manner to wash down surfaces which otherwise would tend to accumulate crystals. It may be noted here that significant advantage is obtained by spraying the make-up liquor downwardly into the uptake. This provides efficient scrubbing of the gas, especially when combined with the mist separator, with a minimum of back pressure. The sprayed particles, moreover, are projected downwardly into the saturator and there comingle with the mist particles produced therein. This helps to combat the condition, previously mentioned, of ammonia in the effluent gas tending to neutralize the mist particles in the saturator. If the mist particles are permitted to become too alkaline, complex ferrocyanides may be precipitated due to the presence of ammonia and hydrogen cyanide in the gas. If this happens, any encrustations above the liquor level will become discolored with the characteristic blue color of ferrocyanide. A distinct advantage is obtained, therefore, by so spraying the make-up liquor into the gas stream that the sprayed liquor comingles with the in situ spray; i. e., the spray which is formed by the gas coming in contact with the saturator liquor in the saturator. Another advantage of spraying the make-up liquor in the gas stream is that the spray particles become suspended therein and are carried over into the mist precipitator where they are deposited. This provides a prolonged gas liquid contact coupled with effective scrubbing of the gas. Moreover, the effective scrubbing is obtained with relatively low back pressures.

The scrubbing liquor should have an acidity higher than, or at least equal to, the acidity of the saturator solution. It should have greater affinity for pyridine than the saturator solution; at least it should not be less. The affinity of the scrubing liquor may be increased by increasing its acidity or by decreasing its pyridine content. Thus, a scrubbing liquor having the same pyridine content as the saturator solution, but higher acidity, would have greater affinity for pyridine. Similarly, a scrubbing liquor having the same acidity but a lower pyridine content would have a higher affinity for pyridine.

Preferably, the scrubbing liquor should be an unsaturated amomnium sulfate solution having an acidity between about 5 and 40% sulfuric acid and a pyridine content below 4 or 5% depending upon the amount of acid. These conditions are suitably obtained by recycling the make-up liquor to the sprayhead 74, the desired degree of acidity being maintained by adding a proper amount of make-up acid by line 42. Desirably, as much acid is added in this manner as possible and acid is added only through line 43 as required to maintain the immediate control of the acid strength of the saturator solution in the saturator. In ordinary operations it is possible to add about two-thirds of the acid to the make-up liquor and thereby to maintain an acid concentration therein of between about 5 and 40% acid. Ordinarily, however, it will be found desirable to operate within the limits of between about 6 and about 15% sulfuric acid. Within these limits the pyridine content is preferably kept below 2 or 3% depending upon the amount of acid.

When the effluent gas contains a substantial amount of ammonia the spray carried over in the effluent gas tends to become neutralized. When such spray is condensed in the spray catcher without treatment of the effluent gas according to the invention, the acidity of the condensate may be so low that it has virtually no affinity for pyridine. Moreover, absorption of ammonia into this spray tends to bring the spray and the condensate into the labile field of supersaturation so that salting out in the flues and spray catcher becomes a problem. In order fully to accomplish the objects of the invention, therefore, I prefer to carry out the primary scrubbing of the ammonia-containing gas with the saturator solution so as to take out the bulk of the ammonia, preferably 75% or more, and to scrub the effluent of the primary scrubbing with sufficient scrubbing liquor to bring into contact with the effluent gas at least one equivalent of sulfuric acid for each equivalent of amomnia that is not absorbed in the primary scrubbing. This will insure that the condensed spray will have an acidity at least substantially equal to that of the saturator solution, that is to say, at least about 5% sulfuric acid, and less than that of the scrubbing liquor, that is to say, less than 40% and preferably less than 15% sulfuric acid. If the volume of the scrubbing liquor thus brought into contact with the effluent gas is sufficiently large, the tendency for ammonium sulfate to salt out will be correspondingly reduced. If the scrubbing liquor is unsaturated with respect to ammonium sulfate, the tendency for ammonium sulfate to salt out is completely avoided. I prefer, therefore, to use in process ammonium sulfate solutions in which the content of dissolved ammonium sulfate is not in the labile field of supersaturation, that is to say, not above about 105% of saturation, and which preferably are unsaturated. Thus in the preferred processes of the invention I scrub the effluent gas of the primary scrubbing with an unsaturated ammonium sulfate solution containing 5 to 40% sulfuric acid at a rate sufficient to bring into contact with the effluent gas at least one equivalent of sulfuric acid for each equivalent of ammonia not absorbed in the primary scrubbing.

Instead of using make-up liquor to scrub the effluent gas I can use the ammonium sulfate liquor by-product of the pyridine recovery and thereby obtain a higher pyridine affinity for the scrubbing liquor. In the pyridine recovery exemplified in U. S. Patents 2,279,585 and 2,311,134 the acidity of the saturator solution containing the pyridine is neutralized thus freeing the pyridine and a separation of the pyridine from the neutral liquor is effected. This neutral liquor may be acidified and utilized as the scrubbing liquor. This embodiment of the invention may be more fully understood by the following description of Figure 2.

Neutral spent liquor from the pyridine recovery is passed through line 86 to a mixing box 88 where it is comingled with sulfuric acid to the desired acidity. The acidified liquor is then sprayed through sprayhead 90 into a suitable scrubber 92 in countercurrent flow to the effluent gas from the saturator entering the scrubber at 94 and leaving it at 96. The exit gas from the scrubbing passes into the mist precipitator 80 and the spent gas is vented through line 84. The liquid effluent of the scrubber 92 and the mist precipitator 80 pass through lines 98 and 100 respectively into line 102 and through line 102 into the pyridine recovery 64, thus completing the cycle involving the pyridine recovery and the scrubbing of the gas effluent of the saturator.

If the saturator is operated as above described the pyridine content gradually builds up in the saturator solution to equilibrium and 100% recovery of pyridine therefore must be effected in the scrubber 92. In order, therefore, to avoid overloading this scrubber and/or requiring excessive scrubber capacity and in order to utilize the inherent capacity of the saturator to absorb pyridine it is desirable to lead off part of the saturator solution to pyridine recovery in order to maintain the pyridine content in the saturator solution sufficiently low to obtain effective absorption of pyridine therein. For this reason I have found it expedient to withdraw part of the overflow from the settling cone 48 into line 102 and to return part of the neutral liquid effluent of the pyridine recovery to the saturator as through line 106. By properly adjusting valves 108 and 110 it is possible to maintain the pyridine content in the saturator solution at the desired figure of less than 5% pyridine and at the same time to maintain an adequate flow of scrubbing liquid to the mixing box 88.

While I have described my invention with reference to particular embodiments thereof, it will be understood that it may be variously embodied and that variation may be made without departing from the spirit and scope of the invention as long as the effluent gas of the saturator is scrubbed with an absorbent for pyridine as set forth.

Figure 2:
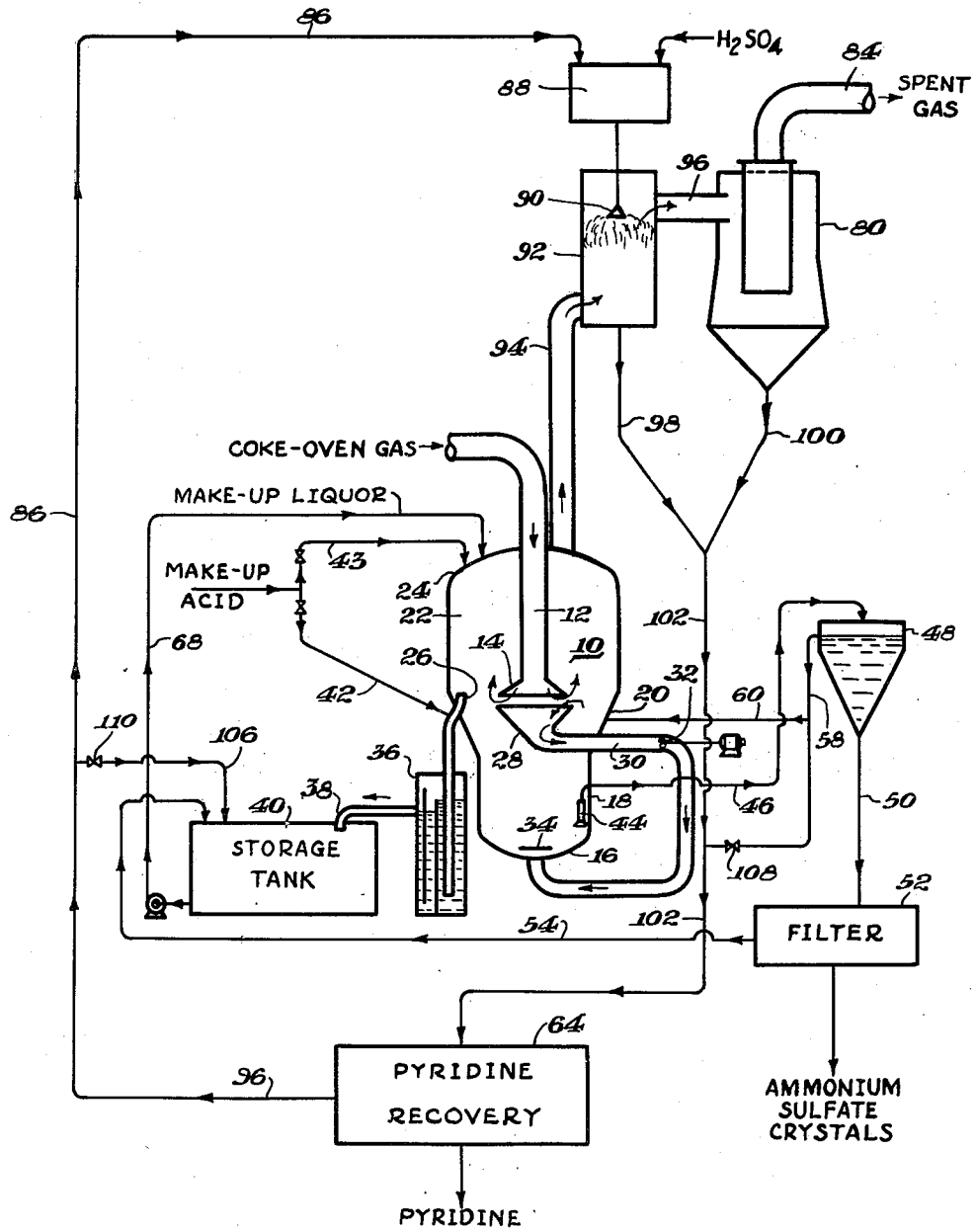

It will be observed in the various modifications described, that a saturator is operated under conditions such that pyridine bases are not adequately recovered from the gas, whether this be due to the use of a low differential or to the accumulation of pyridine in the saturator solution. The effluent gas from the saturator in each case is scrubbed with an absorbent solution having an affinity for pyridine equal to or greater than that of the saturator solution. The liquid effluent of this scrubbing operation is then treated to recover pyridine whether directly as shown in Figure 2 or indirectly as shown in Figure 1.

The acid concentration in the saturator is maintained between about 1 and about 8% sulfuric acid, preferably at about 4 to 6% sulfuric acid. This acidity is maintained by the addition of make-up acid either directly to the saturator through line 43 or indirectly thereto through line 42, using ordinary commercial sulfuric acids of 60° or 66° Baumé. By adding most of the make-up acid to the make-up liquor it is possible to obtain a scrubbing liquor for the effluent gas having a relatively high acid content. When two-thirds of the make-up acid is thus added, the acidity of the make-up liquor will range from 5 to 40% sulfuric acid, depending upon the rate of circulation of this liquor. In general, however, it is not desirable for the scrubbing liquor to have an acidity higher than about 15% sulfuric acid. Where the ammonium sulfate liquor of the pyridine recovery is utilized as the scrubbing liquor, the acid content should be adjusted to approximate that of the saturator solution. Lower or higher acidity may be used, however, depending upon the efficiency of the scrubbing and the volume of liquor utilized. A higher acid strength also may be used up to the capacity of the pyridine recovery to neutralize the acid to ammonium sulfate. Thus, in the broad aspects of the invention, whether embodied as in Figure 1 or Figure 2 or otherwise, the acidity of the scrubbing solution may range from that which will give an affinity for pyridine bases greater than or at least equal to that of the saturator solution up to about 40%. At higher strength than this problems are encountered in regard to the type of equipment required to handle the concentrated sulfuric acid solution, and more particularly in regard to the problem of providing effective scrubbing action where only relatively small volumes of scrubbing liquid can be used. Also at higher strengths there is an undesirable tendency for the strong acid to dehydrate and to sulfonate.

The invention is particularly applicable to those processes which, in order to obtain low pressure differentials, are operated with low seals or other means for reducing the power required to effect the gas liquid contact. In such cases the contact time between the gas and the liquid is too short for adequate removal of pyridine even when the pyridine content of the saturator solution is maintained below 2 or 3% as specified in the prior art. While some variation may be expected according to the efficiency of the liquid gas contact of the saturator, loss in pyridine absorption becomes significant only where differential pressures across the liquid gas contact is less than about 18 inches water column or where the seal at the gas liquid contact is less than about 12 inches. Other forms of saturators including such forms as shown in U. S. Patents 2,375,922; 2,383,171; 2,409,790; 2,424,207 and 2,368,901 which are operated under conditions such that the contact time is insufficient for adequate absorption of pyridine, are subject to improvement by the processes of the invention.

Parts, percentages, etc. as used herein and in the appended claims are by weight unless otherwise specified.

Having thus fully described my invention and set forth the scope thereof, what I claim to be new and patentable is:

1. In a process for the recovery of ammonia and pyridine from coke-oven gas in low differential saturators in which the differential pressure across the gas-liquid contact means of the saturator is less than 18 inches water column the steps of: continuously bringing coke-oven gas into contact with saturator solution in said gas-liquid contact means at a rate such that at least 75 per cent of the ammonia is absorbed and incorporating fresh sulfuric acid in the saturator solution to maintain the acidity of said saturator solution; withdrawing saturator solution from said gas-liquid contact means and treating it to recover ammonium sulfate and pyridine, said pyridine recovery being sufficient to keep the pyridine content of the saturator solution below 5 per cent pyridine; preparing a make-up liquor by adding at least a part of said fresh sulfuric acid to an ammonium sulfate solution which is separate from said saturator solution but which is obtained therefrom in the operation of the process, said make-up liquor being unsaturated with respect to ammonium sulfate and the amount of fresh sulfuric acid added thereto being sufficient to provide an acidity greater than the acidity of said saturator solution but less than 40 per cent sulfuric acid; continuously withdrawing coke-oven gas from said gas-liquid contact means after contact with said saturator solution therein, bringing the withdrawn gas into contact with said make-up liquor in a second gas-liquid contact means, and collecting said make-up liquor after contact with said gas; withdrawing mist-laden coke-oven gas from said second gas-liquid contact means after contact with the make-up liquor therein and passing said mist-laden gas through a mist separator to condense said mist, the withdrawal of mist-laden gas from said second gas-liquid contact means and the condensing of that mist in said mist separator acting to prolong the gas-liquid contact time and to promote effective low differential scrubbing of the residual pyridine from the gas; and treating the collected make-up liquor and the condensed mist to recover pyridine therefrom.

2. The process of claim 1 in which the acidity of the make-up liquor is not greater than about 15 per cent sulfuric acid.

3. The process of claim 1 in which the make-up liquor brought into contact with the withdrawn gas in said second gas liquid contact means contains at least one equivalent of sulfuric acid for each equivalent of ammonia in said withdrawn gas.

4. The process of claim 1 in which the contact between the withdrawn gas and the make-up liquor in said second gas liquid contact means is effected by spraying the make-up liquor downwardly in a column of the withdrawn gas rising vertically from said first gas-liquid contact means at a rate sufficient to bring at least one equivalent of sulfuric acid into contact with said withdrawn gas for each equivalent in said withdrawn gas.

5. In a process for the recovery of ammonia and pyridine from coke-oven gas in low differential saturators in which the differential pressure across the gas-liquid contact means of the saturator is less than 18 inches water column the steps of: continuously bringing coke-oven gas into contact with saturator solution in said gas-liquid contact means and continuously withdrawing saturator solution from contact with said gas in said gas-liquid contact means at a rate sufficient to keep the ammonium sulfate concentration below about 101.5 per cent of saturation and incorporating fresh sulfuric acid in the saturator solution to keep the acidity at between about 4 and 6 per cent sulfuric acid, said gas-liquid contact being effected at a rate such that at least 75 per cent of the ammonia is absorbed; withdrawing saturator solution from said gas-liquid contact means and treating it to recover ammonium sulfate and pyridine, said pyridine recovery being sufficient to keep the pyridine content of the saturator solution below 5 per cent pyridine; preparing a make-up liquor by adding at least a part of said fresh sulfuric acid to an ammonium sulfate solution which is separate from said saturator solution but which is obtained therefrom in the operation of the process, said make-up liquor being unsaturated with respect to ammonium sulfate and the amount of fresh sulfuric acid added thereto being sufficient to provide an acidity greater than the acidity of said saturator solution but less than about 15 per cent sulfuric acid; continuously withdrawing coke-oven gas from said gas-liquid contact means after contact with said saturator solution therein, directing the withdrawn gas to flow upwardly in a column through a second gas-liquid contact means, directing a spray of said make-up liquor downwardly into said upwardly flowing gas in said second gas-liquid contact means, and collecting said spray after contact with said gas; withdrawing mist-laden coke-oven gas from said second gas-liquid contact means after contact with the spray of make-up liquor therein and passing said mist-laden gas through a mist separator to condense said mist, the withdrawal of mist-laden gas from said second gas-liquid contact means and the condensing of that mist in said mist separator acting to prolong the gas-liquid contact time and to promote effective low differential scrubbing of the residual pyridine from the gas; and treating the collected spray and the condensed mist to recover pyridine therefrom.

ELWOOD V. SCHULTE.

REFERENCES CITED

The following references are of record in the file of this patent:

UNITED STATES PATENTS

| Number | Name | Date |
|---|---|---|
| 1,274,998 | Dodge | Aug. 6, 1918 |
| 1,562,914 | Poindexter | Nov. 24, 1925 |
| 1,917,915 | Atwater | July 11, 1933 |
| 2,279,585 | Wald | Apr. 14, 1942 |
| 2,409,790 | Otto | Oct. 22, 1946 |

FOREIGN PATENTS

| Number | Country | Date |
|---|---|---|
| 4,766 | Great Britain | Nov. 16, 1905 |